Aug. 23, 1955  C. U. SAVOYE  2,715,835
VAPOR GENERATING INSTALLATION HAVING A LIQUID LEVEL
INDICATOR WITH AN AUXILIARY LIQUID CHAMBER
Filed Oct. 11, 1950  2 Sheets-Sheet 1

INVENTOR
*Charles U. Savoye*
BY
*R. H. Holbrook* ATTORNEY

Aug. 23, 1955　　　　　C. U. SAVOYE　　　　　2,715,835
VAPOR GENERATING INSTALLATION HAVING A LIQUID LEVEL
INDICATOR WITH AN AUXILIARY LIQUID CHAMBER
Filed Oct. 11, 1950　　　　　　　　　　　　　　　2 Sheets-Sheet 2

INVENTOR
Charles U. Savoye
BY
　　　　ATTORNEY

United States Patent Office 2,715,835
Patented Aug. 23, 1955

2,715,835

VAPOR GENERATING INSTALLATION HAVING A LIQUID LEVEL INDICATOR WITH AN AUXILIARY LIQUID CHAMBER

Charles U. Savoye, Hackensack, N. J., assignor to The Babcock & Wilcox Company, New York, N. Y., a corporation of New Jersey Application October 11, 1950, Serial No. 189,502

6 Claims. (Cl. 73—328)

This invention relates to liquid level indicating apparatus.

The invention relates to apparatus for giving a visual indication of the liquid level in a vapor and liquid separating chamber. It is particularly adapted for use with a vapor generator.

In a more specific sense, the invention includes an improved water connection from the lower end of a tubular water level gauge glass to the water space of a steam and water separating drum whereby the water level within the drum is reliably and accurately indicated visually regardless of difference in density in the water in the glass and the density of the water and steam mixture in the drum above the level of the connection.

The gauge glass water connection of the invention includes a vertically extending open top auxiliary chamber positioned at the location within the drum at which it is desired to determine the water level, the auxiliary chamber having a fluidtight connection from its lower portion to the gauge glass, and a restricted connection from its lower portion to the water space of the drum.

The water within the confines and vertical extent of the auxiliary chamber will be substantially steam free inasmuch as it is separated from the moving steam containing water introduced into the drum which functions to effect separation of the steam and the water. Water separating from the steam in the space above the open top of the auxiliary chamber, drops into the chamber, providing a continual addition and any water in excess of that required to give a column to balance the height of the lower density water steam mixture in the drum proper drains out of the restricted connection to the water space.

The steam free water within the auxiliary chamber effects a static liquid head upon the pressure tight connection to the lower end of the gauge glass causing the water level in the gauge glass to stand at a corresponding head elevation.

In one embodiment of the invention there is a plurality of auxiliary chambers constructed and arranged as above indicated, and, further, having their upper openings in communication with the main vapor and liquid chamber arranged at successively different levels.

In describing the invention a steam generator is referred to as a type of vapor generator in connection with which the illustrative liquid level indicator is utilized.

In the generation of steam, and this is particularly true when impure water is utilized, the water within the steam and water drum becomes more and more concentrated with materials which do not pass off with the steam. When the water becomes highly concentrated the steam does not release itself from the water as readily as when the water is not so concentrated. This results in lower density of the steam and water mixture within the steam and water drum of the steam generator with the result that actual water level within the drum is considerably higher than that indicated by the level of the solid water in the gauge glass which is usually disposed exteriorly of the drum and connected with the steam and water spaces thereof.

Other conditions may also aggravate this difficulty. One of such conditions resides in the differences between the violence with which the fluid within the drum is agitated by the discharges from the different vapor generating tubes which communicate with the drum along its length.

The present invention provides apparatus whereby the gauge glass will indicate the true level of the steam and water mixture within the drum, even when the density of the steam and water mixture is decreased by violent ebullition with water not concentrated with soluble or other material.

The invention will be described with reference to the accompanying drawing in which embodiments of the invention are disclosed.

Figure 1:
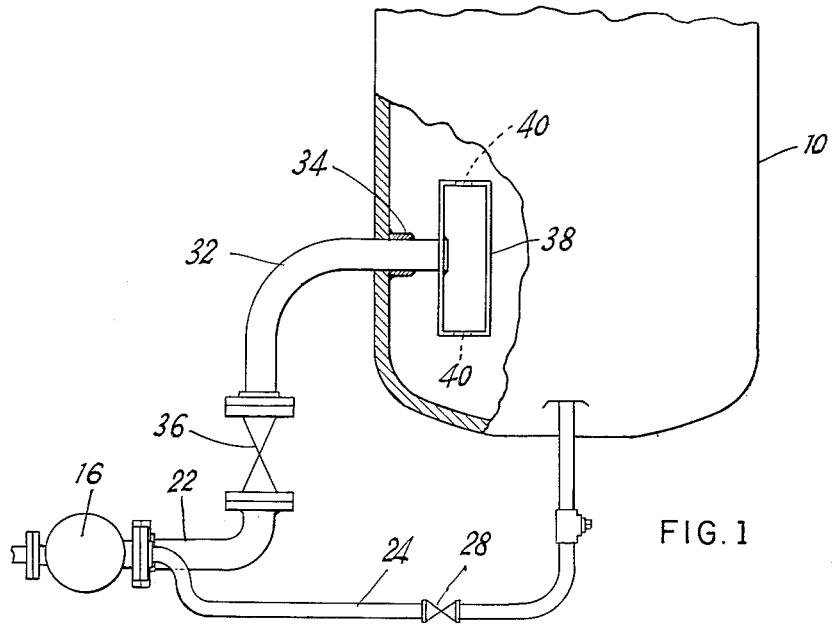
Fig. 1 is a plan of one embodiment of the invention with a part of the steam and water drum broken away to show the auxiliary water chamber therein.
Figure 2:
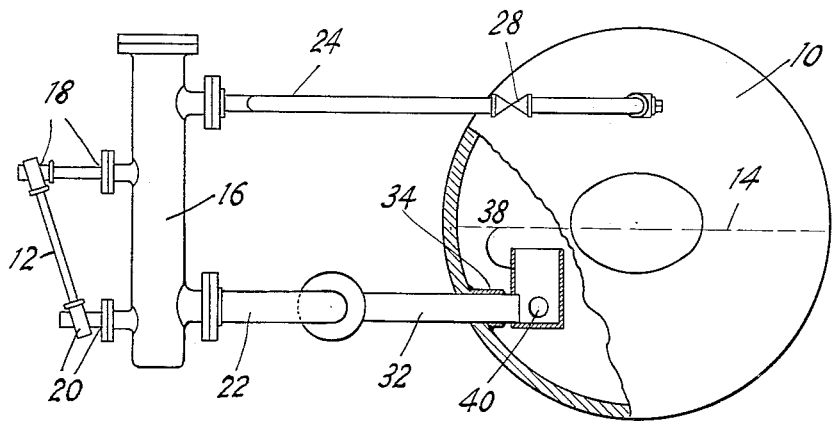
Fig. 2 is mainly an end elevation of the Fig. 1 apparatus with the end of the drum broken away to show the auxiliary chamber and its tubular connections.

In Figs. 1 and 2 of the drawings, there is shown a part of a steam and water drum 10, and a gauge glass 12 to indicate the water level 14 within the drum 10. Steam and water mixtures are normally discharged into the drum through steam generating tubes. The gauge glass is supported upon a water column 16 the interior of which is connected with the gauge glass by upper and lower sets of pressure tight connections such as 18 and 20. The water column is connected to the water space of the drum 10 by conduit elements such as 22 and 32 and the interposed valve 36, and the upper part of the gauge glass has a steam conduit 24 connected to the steam space of the drum. This steam conduit has a valve 28 therein.

The lower conduit element 32 extends through the wall of the drum 10 and is welded thereto as indicated at 34.

Secured to and supported by the end of the conduit 32 within the steam and water drum is an auxiliary water chamber in the form of an open top box 38 with a hole 40 on one side establishing limited communication between the interior of the auxiliary chamber and the water space of the drum and having its upper edge at an elevation slightly below normal operating level.

When steam free water stands at the level of the upper edge of the auxiliary chamber, the level of the lighter density steam containing water in the surrounding drum space will stand at a slightly higher level due to its lower density.

When for some reason, as for example, a reduced firing rate on the boiler, the level of the steam containing water of the drum space is lowered, the level of the steam free water within the auxiliary chamber will also fall commensurately due to drainage through the restricted connection to the drum water space from the lower end of the chamber.

In the embodiment of the invention shown in Fig. 2, it will be noted that the lower water column connection (22 and 32) is substantially at the level of the zero reading of the gauge glass, thereby making it unnecessary to balance with solid water in the gauge glass fitting below zero reading, the equivalent weight of light density water within the drum. The hole 40 is also disposed approximately at the level of the zero reading in the gauge glass so that this hole acts as a lower water column connection to the water in the drum.

By the use of the auxiliary water chamber 38 of large cross-sectional area sufficient steam is separated from the highly concentrated water to keep the auxiliary chamber substantially full, while permitting free flow of solid water through the opening 40. The separation of steam from the water within the chamber 38 takes place without substantial interference by conditions within the water space of the drum and exteriorly of the chamber 38 so that there is a balance of the water level within the chamber 38 with the water level in the gauge glass 12 through the conduit 32, the valve 36, the conduit 22, the water column 16, and the lower gauge glass connections 20. There is also a balance between the water level within the auxiliary chamber 38 and the water space of the drum 10 exteriorly thereof through the opening 40 in the auxiliary chamber.

Figure 3:
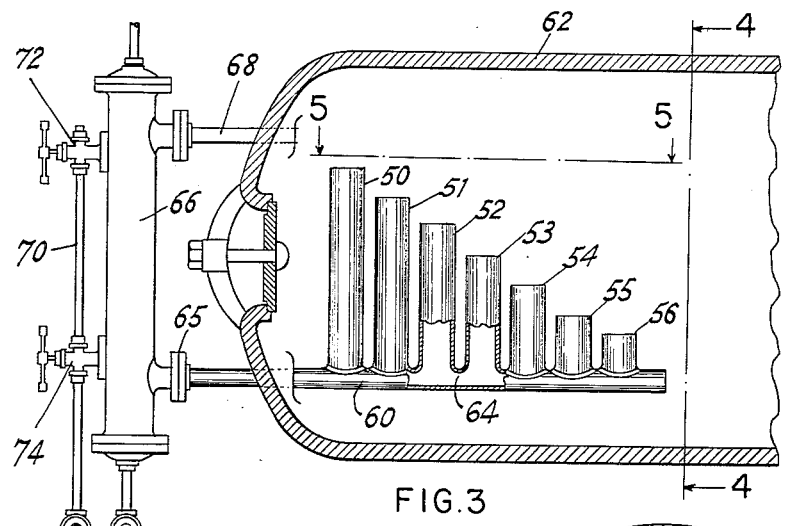
Fig. 3 is a view of another embodiment of the invention with the steam and water drum being shown in vertical section with a plurality of auxiliary water chambers of successively different heights therein.
Figure 6:
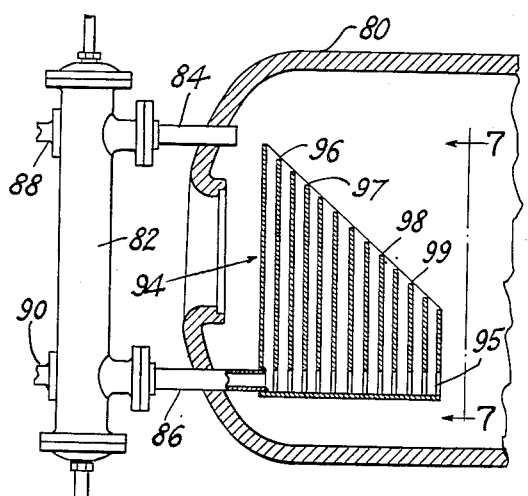
Fig. 6 is a view of another embodiment of the invention similar to that shown in Fig. 3, including a plurality of auxiliary water chambers of successively different heights disposed in parallelism within the steam and water drum.

The graduated top edge embodiments of Figs. 3 and 6, are advantageous when it is desired to obtain an indication of drum water levels through a greater range. With this apparatus, a steam free water column is obtainable without an appreciable overlay of lighter density steam containing water up to the elevation of the top edge of 50 of Fig. 3, or the edge of plate 96 of Fig. 6.

Figure 5:
Fig. 5 is a partial plan showing the shape and arrangement of the auxiliary water chambers of the Fig. 3 embodiment.
Figure 4:
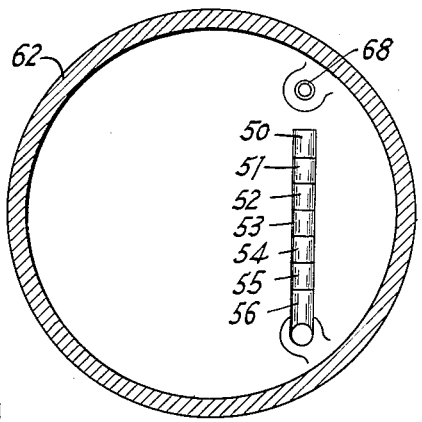
Fig. 4 is a transverse vertical section on the section line 4—4 of Fig. 3.

In the embodiment indicated in Figs. 3, 4, and 5 of the drawings there is a series of different upright auxiliary water chambers such as 50–56, of graduated heights. These water chambers are formed by tubular sections of the configuration indicated in Fig. 5. They are welded at their lower ends to a horizontal pipe 60 extending into the drum 62, as shown. This pipe has an opening in its right hand end communicating with the water space of the drum and the openings in this horizontal pipe (such as the opening 64) between the successive auxiliary water chambers 52 and 53 are restricted as compared to the cross-sectional area of each auxiliary water chamber.

The pipe 60 is connected as at 65 with the lower end of water column 66. The upper end of the latter is connected to the steam space of the drum by a conduit 68. The water column supports the gauge glass 70 by upper and lower connections 72 and 74, respectively.

Any single auxiliary water chamber such as the chamber 50 of the Fig. 3 embodiment, operates with its connections in the same manner as the auxiliary water chamber 38 of the Fig. 1 embodiment. When the level of the water within the drum 62 falls below the level of the top of the auxiliary water chamber 50 the water within the latter flows into and along the pipe 60 until a condition of equilibrium is reached at the next lower drum and water level. This may be indicated by the top of any one of the successively shorter auxiliary water chambers such as 51.

Figure 7:
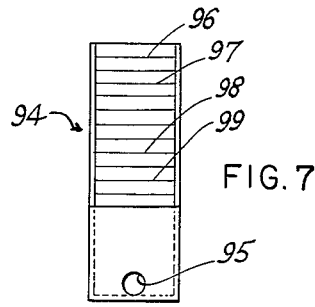
Fig. 7 is an end elevation of the assembly of auxiliary water chambers as indicated by the line and arrows 7—7 of Fig. 6.

The embodiment indicated in Figs. 6 and 7 is quite similar to that indicated in Figs. 3, 4, and 5, including the drum 80, the water column 82, and upper and lower drum connections 84 and 86 supporting the water column from the drum. Attached to the water column by the upper and lower connections 88 and 90 is a gauge glass (not shown) similar to that shown in Fig. 3. The lower water column connection 86 has a pipe extending into the auxiliary water chamber indicated generally at 94. This is formed as a box of rectangular cross-section with a plurality of partition plates such as 96–99, therein. These plates separate the water chamber 94 into a plurality of component chambers each plate having an opening such as 95 therein, these openings affording communication between all of the chambers and the pipe 86, as well as the water space of the drum. The successive compartments or divisions of the entire auxiliary water chamber are of succeedingly different heights as indicated, and their arrangement and construction is such that they operate in the same manner as do the auxiliary water chambers of the Fig. 3 embodiment.

While the invention has been disclosed with particular reference to specific embodiments thereof, it is to be appreciated that the invention is not to be taken as limited to all of the details thereof. It is rather to be considered as of a scope commensurate with the scope of the subjoined claims.

What is claimed is:

1. In a vapor generator, a vapor and liquid chamber normally having a liquid level therein and normally having vapor and liquid mixtures discharged thereinto, an upright gauge glass disposed exteriorly of the chamber, a vapor conduit connecting the upper part of the gauge glass and the vapor space of said chamber, metallic means including walls and partitions forming a plurality of rectangular auxiliary liquid chambers disposed within the liquid and vapor chamber, said auxiliary chambers having upper openings at successively higher levels adopted to communicate with the liquid space of the vapor and liquid chamber over a wide range of liquid level variation in the vapor and liquid chamber, and a means including a liquid conduit establishing communication between the lower part of the gauge glass with the lower part of each of said auxiliary chambers, the lower part of each of said auxiliary chambers being in communication with the liquid space of the liquid and vapor chamber through a lower opening of restricted free flow area.

2. In a vapor generator, a vapor and liquid chamber normally having a liquid level therein and normally having vapor and liquid mixtures discharged thereinto, an upright gauge glass disposed exteriorly of the chamber, a vapor conduit connecting the upper part of the gauge glass and the vapor space of said chamber, tubular sections presenting a plurality of auxiliary liquid chambers of successively different heights disposed within the first mentioned chamber, each auxiliary chamber having an upper opening adapted to communicate with the liquid space of the first chamber over a wide range of liquid level variation in the vapor and liquid chamber, said upper openings being at successively different levels, and a liquid conduit connecting the lower part of the gauge glass with the lower parts of each of said auxiliary chambers, the lower part of each of said auxiliary chambers being in communication with the liquid space of the liquid and vapor chamber through a lower opening of restricted free flow area.

3. In a vapor generator, a vapor and liquid main chamber normally having a liquid level therein and normally having vapor and liquid mixtures discharged thereinto, an upright gauge glass disposed exteriorly of the chamber, vapor conduit means connecting the upper part of the gauge glass and the vapor space of said chamber, a plurality of auxiliary liquid chambers of successively different heights disposed within the main chamber some of said auxiliary chambers each having an upper opening normally communicating with the vapor space of the main chamber while the remainder normally have free communication at their tops with the liquid space of the main chamber, said upper openings being at successively different levels, and a liquid conduit means connecting the lower part of the gauge glass with the lower parts of each of said auxiliary chambers, the lower part of each of said auxiliary chambers being also in free communication with the liquid space of the main chamber through a lower opening.

4. In a vapor generator, a vapor and liquid main chamber normally having a liquid level therein and normally having vapor and liquid mixtures discharged thereinto, an upright gauge glass disposed exteriorly of the main chamber, vapor conduit means connecting the upper part of the gauge glass and the vapor space of said chamber, metallic means including forming a plurality of rectangular auxiliary liquid chambers disposed within the main chamber, each of said auxiliary chambers having an upper opening communicating with the main chamber, the upper openings of successive auxiliary chambers being disposed at successively differing elevations some of which are below the normal liquid level and some above that level, and liquid conduit means connecting the lower part of the gauge glass with the lower parts of each of said auxiliary chambers, the lower part of each of said auxiliary chambers being in communication with the liquid space of the main chamber through a lower opening of a free flow area less than the free flow area of its upper opening.

5. In a vapor generator, a vapor and liquid main chamber normally having a liquid level therein and normally having vapor and liquid mixtures discharged thereinto, an upright gauge glass disposed exteriorly of the chamber, vapor conduit means connecting the upper part of the gauge glass and the vapor space of the main chamber, upright tubular sections presenting a plurality of auxiliary liquid chambers having upper openings at successively different elevations disposed within the first mentioned chamber, each auxiliary chamber having its upper opening for free communication with the liquid space of the main chamber, and liquid conduit means connecting the lower part of the gauge glass with the lower parts of each of said auxiliary chambers, the lower part of each of said auxiliary chambers being in communication with the liquid space of the main chamber through a lower opening.

6. In a vapor generator, a pressure vessel in the form of a horizontally elongated hollow right cylinder constituting a vapor and liquid chamber having a normal liquid level in a plane substantially equidistant from and parallel to the top and bottom of the chamber, an upright liquid column member between the pressure vessel and the gauge glass, a gauge glass disposed exteriorly of the chamber, vapor conduit means connecting the upper parts of the gauge glass and the liquid column member with the vapor space of said chamber, an auxiliary liquid chamber disposed within the first mentioned chamber and having at an upper position free flow communication with the liquid space of the first chamber close to the normal liquid level, and a horizontally extending conduit means connecting the lower part of the gauge glass and the lower part of the liquid column member, with the lower part of said auxiliary chamber at the level of the zero reading of the gauge glass, the lower part of said auxiliary chamber being in free flow communication with the liquid space of the liquid and vapor chamber through a lower opening, the free flow area of the communication at the upper position being much greater than the free flow area of the communication at the lower part of the auxiliary chamber.

References Cited in the file of this patent

FOREIGN PATENTS 420,442    Great Britain _____ Dec. 3, 1934